July 17, 1928. 1,677,132
J. G. COLLINS
HIGH PRESSURE POWER PRESS
Filed Nov. 8, 1921 3 Sheets-Sheet 1
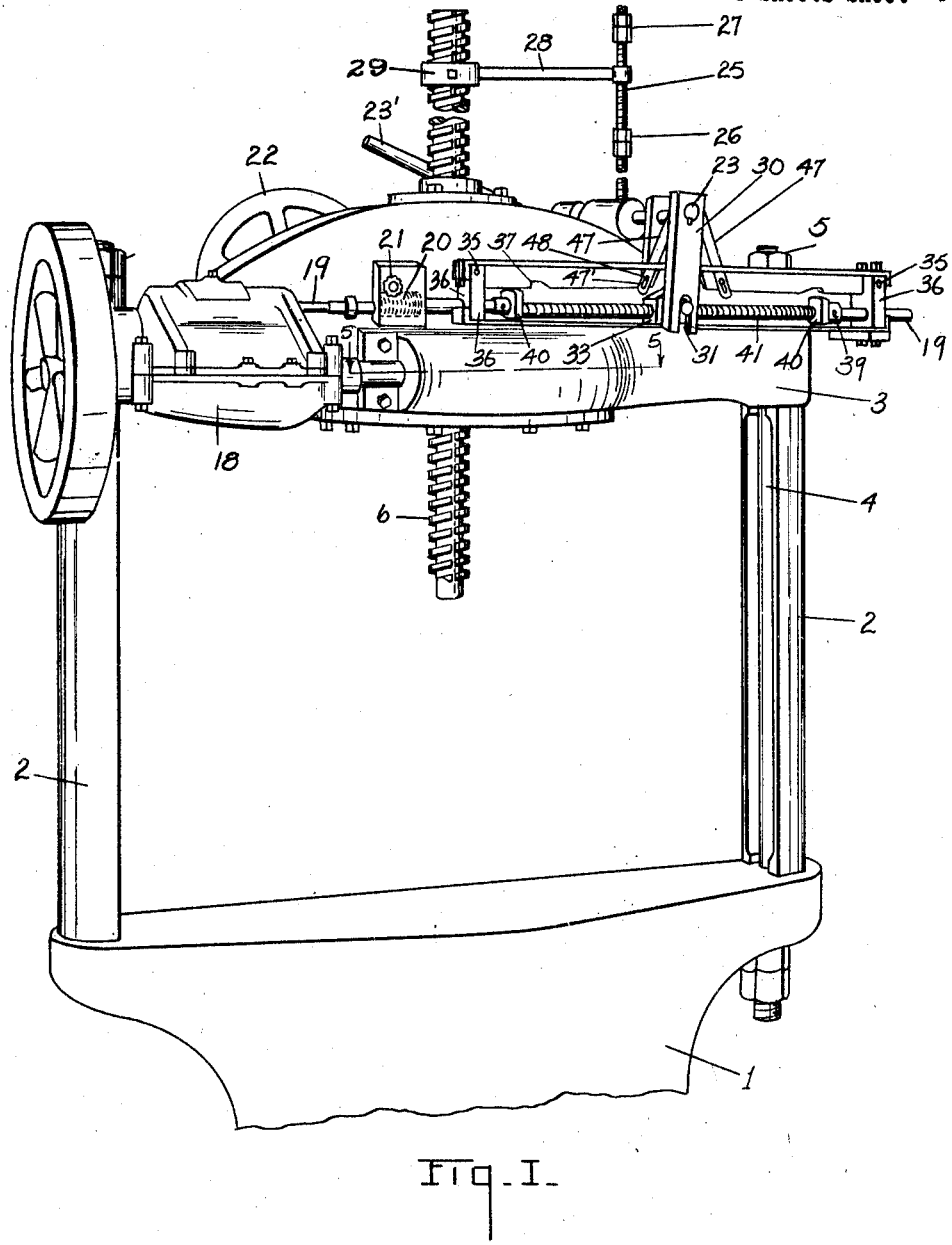
Fig. I.
Inventor
James G. Collins
By Chappell & Earl
Attorneys.

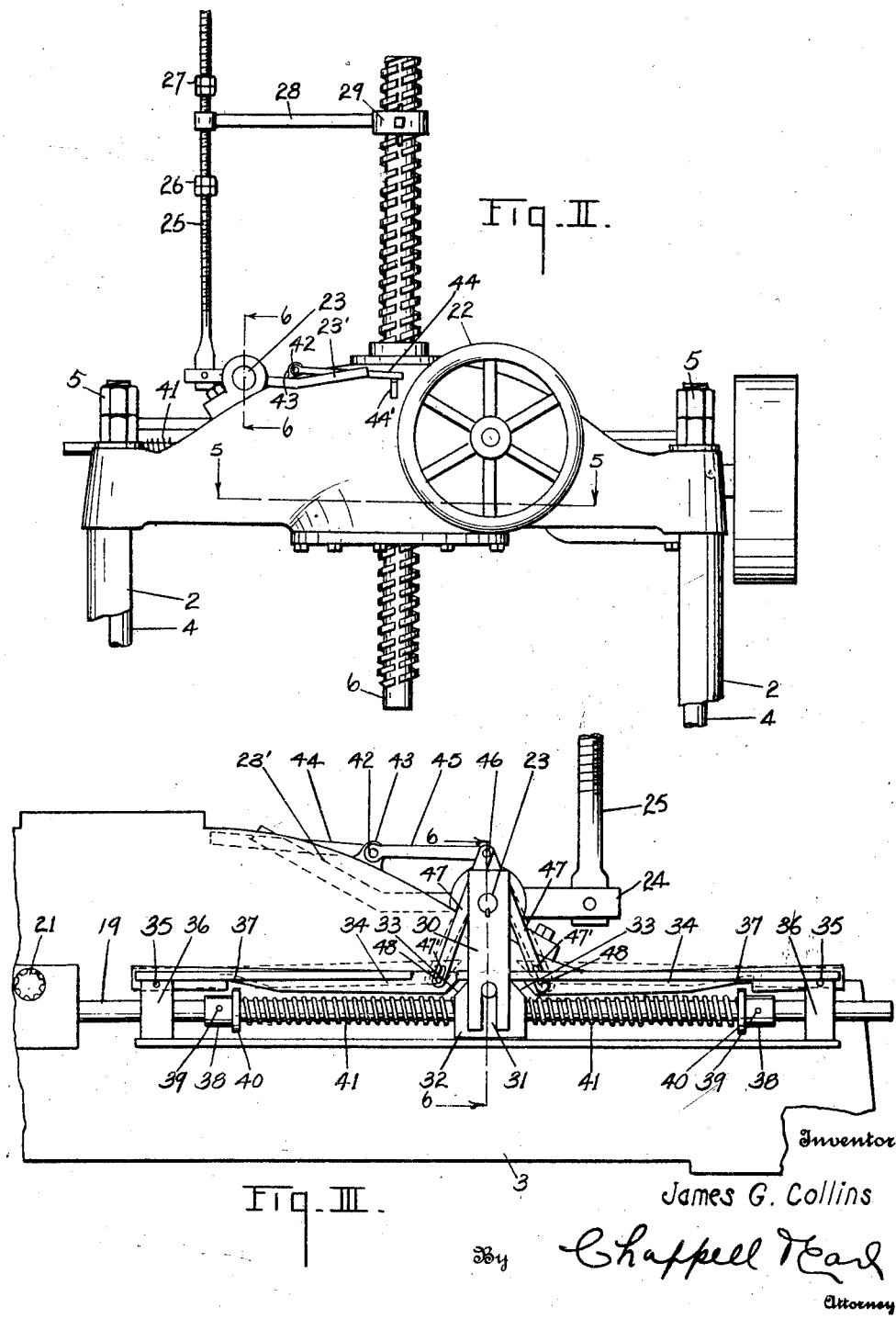

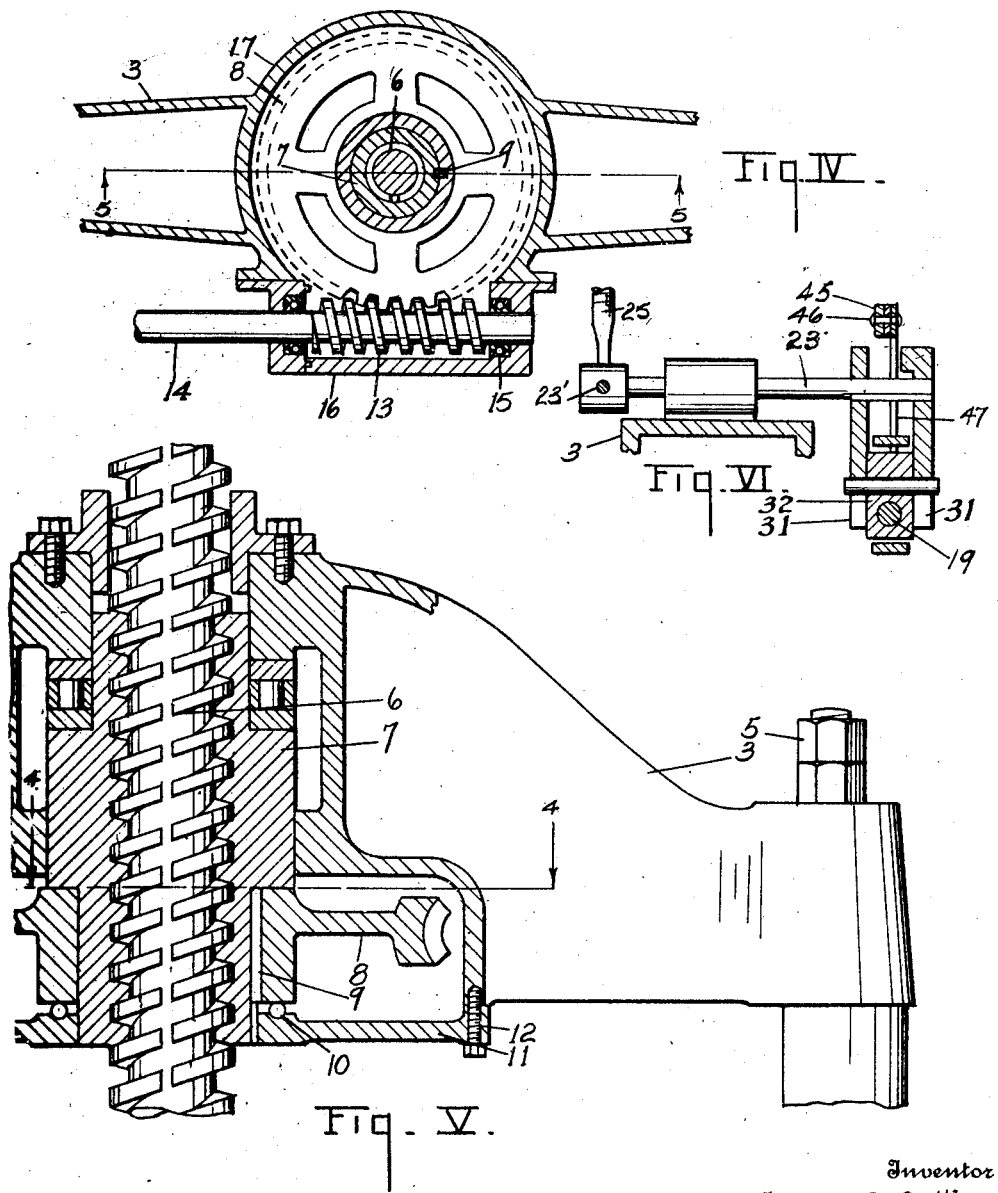

Patented July 17, 1928.

1,677,132

UNITED STATES PATENT OFFICE.

JAMES G. COLLINS, OF KALAMAZOO, MICHIGAN, ASSIGNOR TO ATLAS PRESS COMPANY, OF KALAMAZOO, MICHIGAN.

HIGH-PRESSURE POWER PRESS.

Application filed November 8, 1921. Serial No. 513,813.

This invention relates to improvements in high pressure power presses.

The objects of the invention are:

First, to provide such a high power press with an effective automatic reverse.

Second, to provide an improved gear structure for such a press.

Third, to provide an improved control means therefor.

Further objects, and objects relating to details and economies of construction and operation will definitely appear from the detailed description to follow.

I accomplish the objects of the invention by the devices and means described in the following specification. The invention is clearly defined and pointed out in the claims.

A structure which is a preferred embodiment of the invention is fully illustrated in the accompanying drawing, forming a part of this application, in which:

Fig. I is a detail perspective view of the upper part of a power press embodying the features of my invention, portions of the base and of the driving gear being broken away and the screw and stop means being shown in broken sections, certain parts being indicated by dotted lines, the same being taken angling from the front of the machine.

Fig. II is a rear elevation of the upper part of the structure as seen in Fig. I.

Fig. III is an enlarged detail elevation view of the reversing screw means and the hand actuated pinion means for controlling the press.

Fig. IV is an enlarged detail horizontal sectional view on line 4—4 of Figs. I, II and V, showing the worm gear for driving the nut and the reversible worm for actuating the same in full lines.

Fig. V is an enlarged detail sectional view on line 5—5 of Fig. IV, showing the screw threaded ram, the nut and the worm gear for driving the same with the bearings and supports therefor.

Fig. VI is an enlarged detail sectional view on line 6—6 of Figs. II and III.

In the drawings similar reference characters refer to similar parts throughout the several views and the sectional views are taken looking in the direction of the little arrows at the ends of the section lines.

Considering the numbered parts of the drawing by their numerals, 1 is the base, shown fragmentary. 2, 2 are the supporting columns of the frame carrying the heavy cross frame 3 which is retained upon the base by the tie bolts 4 having lock nuts 5 at the top and bottom. The ram 6 is splined to the cross beam and screw threaded and carried in the revoluble nut 7. The nut 7 is supported in anti-friction bearings, preferably of the roller type, within the crossbeam 3 of the frame.

A worm gear 8 is keyed to the nut at 9 and is held up by thrust ball bearings 10 on the supporting plate 11. The supporting plate 11 is held in place by the cap screws 12, see particularly Figs. I and V.

The worm gear 13 on shaft 14 is supported in anti-friction bearings 15 in the housing 16 at one side of the housing 17 for said worm gear, the housings being provided particularly for the retention of lubricant.

The shaft 14 is driven by reverse gear mechanism 18 which is of a well-known marine propeller reverse type, (not necessary here to illustrate as the same can be purchased in the open market) the same being controlled by the rod 19, which is movable endwise to accomplish this result. This rod extends to the automatic control. It is provided with a rack 20 and pinion 21 controlled by hand wheel 22 when it is desired to control the movement of the press by hand.

The rod is controlled automatically from the rock shaft 23, which is provided with an arm 24, which is actuated by the connecting rod 25 adjacent stops 26, 27, thereon, such stops comprising locking nuts adjustable on the screw threaded rod 25, thereby permitting very close adjustment.

An arm 28 with collar 29 surrounding and clamped to the screw threaded ram 6 acts upon the said stops for rocking the said rock shaft 23.

A downwardly projecting arm 30 with slot 31 in its lower end reciprocates slide 32 as the means for actuating and controlling the control rod 19 to the reverse gear. The slide 32 is provided with oppositely disposed inclined faces 33, 33 which act upon latches 34, 34 at each side, the latches being pivoted at 35 on suitable supports 36, 36, through which the said rod 19 reciprocates.

The notches 37, 37 of the latches engage collars 38, 38 pinned to the said rod 19 by pins 39. Flanges 40 project out from the said collars to engage the notches 37 of the said latches 34. Heavy compression springs 41, 41 are interposed between the slide 32 and the collars 38, 38 at each side thereof. It will thus be seen that on the up movement of the ram 6 the arm 28 will be carried up against the stop 27, pulling upwardly on the rock shaft arm 24, rocking the same and swinging the arm 30 towards the right, as seen in Figs. I and III, thereby actuating the slide 32 and compressing the spring 41 against the right-hand collar. The right-hand inclined face 33 also slides under the inclined end of the latch 34 and eventually lifts the same out of engagement with the collar by lifting the notch 37 away from the flange 40. The spring 41 then shoots the rod 19 to the right and throws the reversible gear 18 into action, driving the worm and carrying the ram downwardly until the arm 28 contacts with the stop 26 and forces the parts enumerated in the contrary direction until the left hand latch is released and the control rod shot in that direction reversing the reverse gear and causing the ram to rise. The speed is preferably higher on the reverse or up direction and is gaged so that an operator has time to place work under the ram and hold in place for the action of the ram and to remove the same when the ram rises and place a succeeding article in position.

The ram is of very high power within moderate limits of construction, readily exerting a pressure of twenty to thirty tons, and is so readily regulated that it reverses within a very small fraction of an inch, making it exceedingly regular in its operation.

When it is desired to control the ram by the hand of the operator it is of course necessary to throw the automatic stop mechanism out of gear. To accomplish this, a rock shaft 42 in bearings 43 is provided with an actuating handle 44 and with an arm 45 to which is pivotally connected at 46 a pair of links, 47, 47. These extend downwardly at each side of the rock shaft 23 and engage pins 48, 48 on the ends of the latches 34. Slots 47' are in the ends of the links 47 to permit the latches to play freely up and down therein and at the same time enable the latches to be elevated by the depression of the handle 44, (see Fig. III). The handle 44, when depressed, snaps under a catch 44' (see Fig. II) to throw the automatic reverse permanently out of gear. A hand lever 23' is provided for the rock shaft 23 to start the machine and put the automatic mechanism into operation. It is clear that when the machine is at neutral, as seen in Fig. III, it will remain so until something sets it in motion, which is done by depressing the lever 23'. If the machine is in gear such a manipulation will not be necessary. It is possible to stop and start by the manipulation of this lever 23' as well as by the manipulation of the hand wheel 22. The pinion 21 is preferably withdrawn from engagement when the automatic device is being used.

I have shown the double control for the shift connection to the reverse gear, but it is clear that this could be adapted for use as a single control for the downstroke where accuracy is required and the hand of the operator or other stop means might be provided for the end of the upstroke.

I have described my improved power press in the form in which I prefer, but clearly the parts can be greatly modified and many features varied without departing from my invention. I desire to claim the invention in the specific form illustrated and also broadly as pointed out in the appended claim.

Having thus described my invention, what I claim as new and desire to secure by Letters Patent, is:

A power press, stop means for controlling the same comprising pivoted latches with beveled ends, a slide for actuating the same alternately, and a rock shaft with arm and slot link connections for raising said latches out of engagement, as specified.

In witness whereof, I have hereunto set my hand,

JAMES G. COLLINS.